US009282347B2

(12) United States Patent
Drang et al.

(10) Patent No.: US 9,282,347 B2
(45) Date of Patent: *Mar. 8, 2016

(54) CONTROLLED RATE VOD SERVER

(71) Applicant: Fabrix TV Ltd., RaAnana (IL)

(72) Inventors: Nir Drang, Hod-HaSharon (IL); Tomer Amiaz, Tel-Aviv (IL); Ram Ben-Yakir, Herzlia (IL)

(73) Assignee: Fabrix TV Ltd., RaAnana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/280,736

(22) Filed: May 19, 2014

(65) Prior Publication Data
US 2014/0250476 A1    Sep. 4, 2014

Related U.S. Application Data

(63) Continuation of application No. 12/933,435, filed as application No. PCT/IL2008/000377 on Mar. 18, 2008, now Pat. No. 8,732,786.

(51) Int. Cl.
*H04N 7/16* (2011.01)
*H04N 21/234* (2011.01)
(Continued)

(52) U.S. Cl.
CPC ........... *H04N 21/234* (2013.01); *H04N 19/115* (2014.11); *H04N 19/146* (2014.11); *H04N 19/164* (2014.11); *H04N 19/177* (2014.11); *H04N 19/40* (2014.11); *H04N 21/21* (2013.01); *H04N 21/2225* (2013.01); *H04N 21/23* (2013.01); *H04N 21/2343* (2013.01); *H04N 21/2347* (2013.01); *H04N 21/2365* (2013.01);
(Continued)

(58) Field of Classification Search
USPC ................... 725/98, 118, 134, 144, 145, 148
See application file for complete search history.

(56) References Cited

U.S. PATENT DOCUMENTS 6,279,040 B1 * 8/2001 Ma et al. ................. 709/231
6,477,706 B1 * 11/2002 Hua et al. ................. 725/96
(Continued)

FOREIGN PATENT DOCUMENTS

CN    1631041    6/2005
EP    0971542    1/2000
(Continued)

OTHER PUBLICATIONS

Applicant-Initiated Interview Summary Dated Jun. 27, 2013 From the US Patent and Trademark Office Re. U.S. Appl. No. 12/933,435.
(Continued)

*Primary Examiner* — Nnenna Ekpo

(57) ABSTRACT

A distributed stream processing system including a plurality of storage devices, at least one of which is configured to process at least one segment of a data stream, thereby producing a changed segment of the data stream, and provide output of at least the changed segment of the data stream, and a server configured to accept the output of the storage devices and combine the output into a transport stream. A method for combining a plurality of data streams including using one or more storage devices for processing at least one segment of a data stream, thereby producing a changed segment of the data stream, and providing output of at least the changed segment of the data stream, and combining the output of the storage devices into a combined data stream. Related apparatus and methods are also described.

19 Claims, 4 Drawing Sheets

(51) Int. Cl.
*H04N 21/21* (2011.01)
*H04N 21/23* (2011.01)
*H04N 21/231* (2011.01)
*H04N 21/2343* (2011.01)
*H04N 21/2347* (2011.01)
*H04N 21/236* (2011.01)
*H04N 21/2365* (2011.01)
*H04N 21/2383* (2011.01)
*H04N 21/262* (2011.01)
*H04N 21/434* (2011.01)
*H04N 21/472* (2011.01)
*H04N 21/8358* (2011.01)
*H04N 21/845* (2011.01)
*H04N 21/2225* (2011.01)
*H04N 19/115* (2014.01)
*H04N 19/146* (2014.01)
*H04N 19/164* (2014.01)
*H04N 19/177* (2014.01)
*H04N 19/40* (2014.01)
*H04N 21/20* (2011.01)

(52) U.S. Cl.
CPC ..... *H04N 21/2383* (2013.01); *H04N 21/23106* (2013.01); *H04N 21/23424* (2013.01); *H04N 21/23439* (2013.01); *H04N 21/23611* (2013.01); *H04N 21/23655* (2013.01); *H04N 21/234309* (2013.01); *H04N 21/26208* (2013.01); *H04N 21/4347* (2013.01); *H04N 21/47202* (2013.01); *H04N 21/8358* (2013.01); *H04N 21/8456* (2013.01); *H04N 2021/225* (2013.01)

(56) References Cited

U.S. PATENT DOCUMENTS

| | | | |
|---|---|---|---|
| 6,848,117 | B1 | 1/2005 | Emura |
| 7,356,079 | B2* | 4/2008 | Laksono et al. ......... 375/240.03 |
| 8,732,786 | B2 | 5/2014 | Drang et al. |
| 2002/0078174 | A1* | 6/2002 | Sim et al. ............... 709/219 |
| 2002/0147829 | A1 | 10/2002 | Assa et al. |
| 2003/0095594 | A1 | 5/2003 | Laksono et al. |
| 2003/0152148 | A1 | 8/2003 | Laksono |
| 2005/0144641 | A1* | 6/2005 | Lewis ............... 725/60 |
| 2006/0088052 | A1 | 4/2006 | Sauser, Jr. et al. |
| 2006/0227813 | A1 | 10/2006 | Mavrogeanes |
| 2007/0115969 | A1 | 5/2007 | Isnardi |
| 2007/0200949 | A1* | 8/2007 | Walker et al. ............. 348/412.1 |
| 2008/0235200 | A1* | 9/2008 | Washington et al. ........... 707/4 |
| 2009/0182843 | A1* | 7/2009 | Hluchyj et al. ............. 709/219 |
| 2011/0197233 | A1 | 8/2011 | Paik et al. |

FOREIGN PATENT DOCUMENTS

| | | |
|---|---|---|
| WO | WO 99/39501 | 8/1999 |
| WO | WO 2006/067373 | 6/2006 |
| WO | WO 2009/116024 | 9/2009 |

OTHER PUBLICATIONS

Communication Pursuant to Rules 70(2) and 70a(2) EPC Dated Jan. 19, 2012 From the European Patent Office Re. Application No. 08720002.8.

International Preliminary Report on Patentability Dated Sep. 30, 2010 From the International Bureau of WIPO Re. Application No. PCT/IL2008/000377.

International Search Report and the Written Opinion Dated Jul. 14, 2008 From the International Searching Authority Re. Application No. PCT/IL2008/000377.

Notice of Allowance Dated Feb. 21, 2014 From the US Patent and Trademark Office Re. U.S. Appl. No. 12/933,435.

Office Action Dated May 14, 2013 From the US Patent and Trademark Office Re. U.S. Appl. No. 12/933,435.

Office Action Dated Oct. 17, 2013 From the US Patent and Trademark Office Re. U.S. Appl. No. 12/933,435.

Office Action Dated Sep. 24, 2012 From the US Patent and Trademark Office Re. U.S. Appl. No. 12/933,435.

Supplementary European Search Report and the European Search Opinion Dated Jan. 2, 2012 From the European Patent Office Re. Application No. 08720002.8.

Translation of Office Action Dated May 2, 2012 From the State Intellectual Property Office of the People's Republic of China Re. Application No. 200880129369.5.

Requisition by the Examiner and Examination Search Report Dated Dec. 4, 2014 From the Canadian Intellectual Property Office Re. Application No. 2,717,882.

* cited by examiner

CONTROLLED RATE VOD SERVER

RELATED APPLICATIONS

This application is a continuation of U.S. patent application Ser. No. 12/933,435 filed on Sep. 20, 2010, which is National Phase of PCT Patent Application No. PCT/IL2008/000377 having International filing date of Mar. 18, 2008. The contents of the above Application is incorporated herein by reference.

FIELD AND BACKGROUND OF THE INVENTION

The present invention, in some embodiments thereof, relates to a digital video server and, more particularly, but not exclusively, to a digital video server for video-on-demand services.

Digital video is often distributed as streams of digital data. One well known protocol for video data is MPEG.

Video streams, such as MPEG streams, typically have a Variable Bit Rate (VBR). The video streams are typically compressed, and the amount of compression depends on complexity of the scene, and on the amount of changes between scenes.

The MPEG video compression protocols compress video by reducing pixel data redundancy within an image, and also redundancy between neighboring images. MPEG video compression groups several consecutive images into a Group Of Pictures (GOP), and defines most of the pictures, also termed video frames, by their difference from a neighboring picture, which is also in the GOP.

A GOP contains X amount of data for N video frames, which need to be played out at a rate of R frames per second, thereby having a bit rate proportional to $X*R/N$. If there is need to lower the bit rate of a video stream, pictures in a GOP need to be changed together, since the pictures depend on each other for reconstruction.

In cases where video streams are distributed to customers, several video streams are sometimes combined in one transport stream, termed a Multiple Program Transport Stream (MPTS). In some cases a transport stream contains only one program. Such transport streams are termed Single Program Transport Streams (SPTS).

One example of video distribution, which is becoming more and more common nowadays, is distribution of Video On Demand (VOD). Customers request to receive specific videos, and VOD suppliers transmit each video requested by the customers. For example, the VOD supplier transmits several MPEG streams, some of different videos, and some of the same videos started at different times.

A transport stream often has a Constant Bit Rate (CBR). The bit rate of the transport stream is often a physical upper limit of some device in the transmission path. In other cases the transport stream has a bit rate assigned to it by a service provider which performs the transmission. A VOD supplier may purchase one or more units of such and such bandwidth, to use for supplying video on demand.

Combining VBR streams into a CBR transport stream can be done. Care must be taken that the total bit rate of the combination of VBR streams never exceeds the CBR limit, otherwise the CBR transport stream may well crash, or be cut off by the service provider which performs the transmission. Sometimes, the combining combines the streams by taking each of the constituent VBR streams into account as if it constantly has a maximum bit rate, and whenever the total bit rate of the combined VBR streams falls below the CBR of the transport stream, padding is added.

Lowering a bit rate of a video stream can be done. It is a computation intensive task. MPEG streams, for example, are compressed for ease of decompression, having a relatively computationally simple decompression, and a relatively computation intensive compression. Therefore bit rate lowering of MPEG streams, which involves decompression (easy) and subsequent compression (hard) is computationally intensive.

SUMMARY OF THE INVENTION

An aspect of some embodiments of the invention relates to using a distributed data storage system for distributed processing of data stored on the distributed storage nodes. Some types of processing are computation intensive, such as, by way of a non-limiting example, video stream processing. One or more computers may control the processing, instructing data storage nodes, which also have some processing capability, to perform some or all of the processing.

An aspect of some embodiments of the invention relates to controlling a bit rate of a transport stream by controlling the bit rate of components of the transport stream. Changing bit rate can be computation intensive, and changing the bit rate of components of the transport stream is performed in a distributed fashion, so as to spread the computation load away from just one computer.

The changing of bit rate may be done in real time, that is, just prior to transmitting the transport stream, or may be done ahead of real time, and changed bit rate stream components can be saved until needed.

According to an aspect of some embodiments of the present invention there is provided a distributed stream processing system including a plurality of storage devices, at least one of which is configured to process at least one segment of a data stream, thereby producing a changed segment of the data stream, and provide output of at least the changed segment of the data stream, and a server configured to accept the output of the storage devices and combine the output into a transport stream.

According to some embodiments of the invention, the process includes changing the bit rate.

According to some embodiments of the invention, the at least one storage device is further configured to store at least the changed segment of the data stream.

According to some embodiments of the invention, the server is configured to provide bit rate control instructions to the plurality of storage devices, and the plurality of storage devices are configured to accept the bit rate control instructions from the server and to change the bit rate of the segment of a data stream according to the instructions.

According to some embodiments of the invention, at least one of the data streams is a video stream. According to some embodiments of the invention, the process includes transcoding the video stream. According to some embodiments of the invention, the process includes inserting content into the video stream. According to some embodiments of the invention, the process includes producing video effects in the video stream. According to some embodiments of the invention, the process includes content protection processing with respect to the video stream. According to some embodiments of the invention, the process includes searching in the video stream.

According to some embodiments of the invention, the storage devices use a data protection scheme to store the changed segment of the data stream.

According to some embodiments of the invention, further including producing and storing metadata including information about a bit rate of the changed segment of the data stream.

According to an aspect of some embodiments of the present invention there is provided a method for combining a plurality of data streams including using one or more storage devices for processing at least one segment of a data stream, thereby producing a changed segment of the data stream, and providing output of at least the changed segment of the data stream, and combining the output of the storage devices into a combined data stream.

According to some embodiments of the invention, the processing includes changing a bit rate.

According to some embodiments of the invention, further including storing the at least the changed segment of the data stream.

According to some embodiments of the invention, further including providing bit rate control instructions to the plurality of storage devices, and the storage devices accepting the bit rate control instructions from the server and changing the bit rate of the segment of a data stream according to the instructions.

According to some embodiments of the invention, at least one of the data streams is a video data stream. According to some embodiments of the invention, the processing includes video stream processing.

According to some embodiments of the invention, further including, after the changing, storing the changed segment of the data stream, and performing the providing upon a request from the server.

According to some embodiments of the invention, further including producing and storing metadata including information about a bit rate of the changed segment of the data stream.

According to an aspect of some embodiments of the present invention there is provided a system configured to receive a transport stream including a plurality of data streams including a server configured to split the transport stream into a plurality of data streams, a plurality of storage devices configured to receive and store one or more of the data streams from the server, at least one of the storage devices being further configured to process at least one segment of a data stream, thereby producing a changed segment of the data stream, and store at least the changed segment of the data stream.

According to some embodiments of the invention, the process includes changing the bit rate.

According to some embodiments of the invention, at least one of the data streams includes a video stream, and the process includes video stream processing.

According to an aspect of some embodiments of the present invention there is provided a method for receiving a transport stream including a plurality of data streams including splitting the transport stream into a plurality of data streams, storing the data streams on a plurality of storage devices, using at least one of the storage devices for processing at least one segment of a data stream, thereby producing a changed segment of the data stream, and storing the changed segment of the data stream.

According to some embodiments of the invention, the processing includes changing a bit rate.

According to some embodiments of the invention, at least one of the data streams is a video stream, and the processing includes video stream processing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
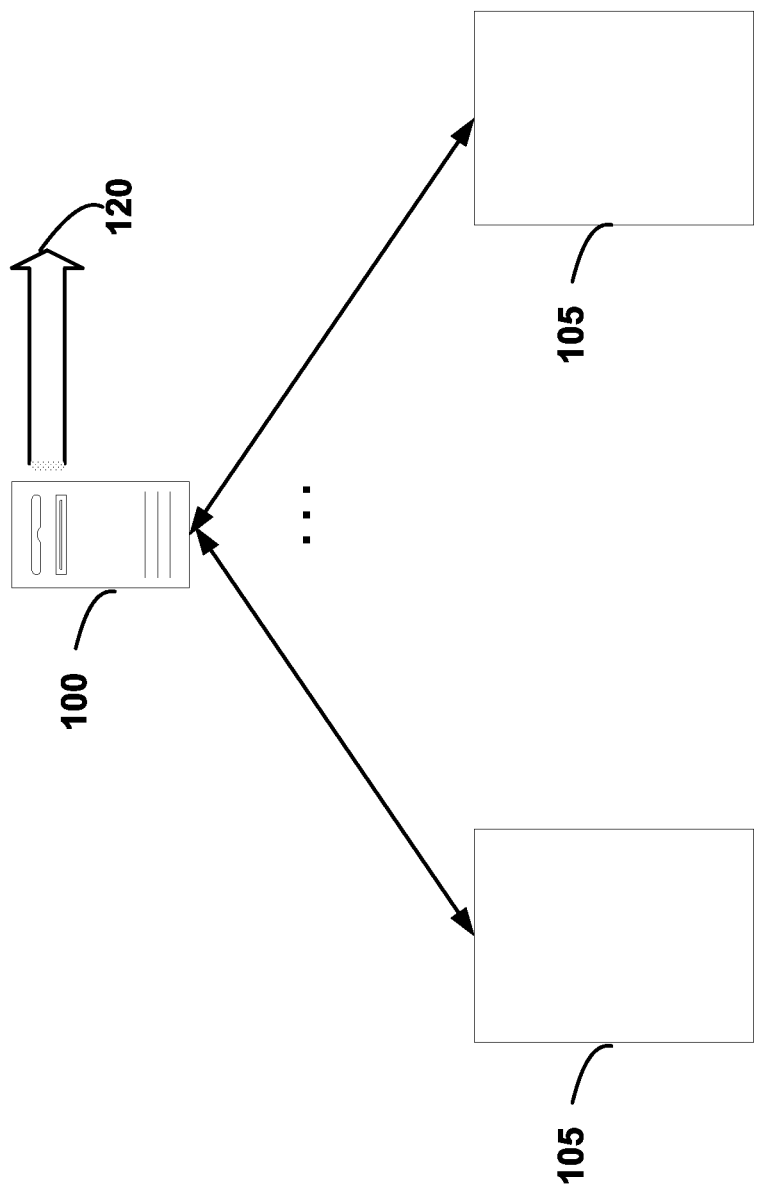
FIG. 1 is a simplified illustration of a system constructed and operative according to an exemplary embodiment of the invention.

The present invention, in some embodiments thereof, relates to a digital video server and, more particularly, but not exclusively, to a digital video server for video-on-demand services.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

An aspect of some embodiments of the invention relates to using a distributed data storage system for distributed processing of data stored on the distributed storage nodes. One or more computers may control the processing, and data storage nodes, which also have some processing capability, perform at least some of the processing.

Some types of processing are computation intensive, such as, by way of a non-limiting example, video stream processing. Non-limiting examples of computation intensive video stream processing include:

1. Rate shaping video streams, that is, changing the bit rate of video streams. Often the changing is a lowering of the bit rate of a video stream in order to fir the video stream into a narrower bandwidth.

2. Transcoding video streams, from one format to another, such as, by way of a non-limiting example, MPEG2 to MPEG4 or vice versa, High Definition (HD) to Standard Definition (SD) or vice versa.

3. Content processing, such, by way of a non-limiting example, inserting additional content such as a banner into a video stream, a logo into a video stream, producing a Picture-In-Picture (PIP) video stream, and adding a voice overlay or a video overlay.

4. Video effect processing, such as, by way of a non-limiting example, fade-in, fade-out, alpha blending, changing brightness, and a wipe effect.

5. Content protection processing, such as, by way of a non-limiting example, encryption, decryption, inserting a watermark, deleting a watermark.

6. Searching within a video stream, such as, by way of a non-limiting example, searching for a caption, and/or other searchable attributes.

Some embodiments contemplated include combining data streams stored on data storage nodes into a transport stream, while processing at least some of the data streams.

Some embodiments contemplated include receiving a transport stream containing data streams, splitting the transport stream into data streams for storage in storage devices, while having some of the storage devices process at least part of the data streams, and storing the processed part.

Examples of specific embodiments are provided herein with reference to Variable Bit Rate (VBR) video streams, such as MPEG video streams, being combined into a Constant Bit Rate (CBR) transport stream. The examples are to be understood in a broader context of VBR data streams being combined into a CBR transport stream.

Other specific embodiments contemplated include receiving a transport stream containing video streams, splitting the transport stream into video streams for storage in storage devices, and instructing some of the storage devices to process at least part of the video streams and store the changed, processed part.

An aspect of some embodiments of the invention relates to controlling a bit rate of a transport stream by controlling the bit rate of video stream components of the transport stream. Changing a bit rate of a video stream can be computation intensive, and changing the bit rate of the video stream components is performed in a distributed fashion, so as to spread the computation load.

It is noted that often video streams are stored on distributed data disks, and combined into a transport stream by a streamer, which is a dedicated computer. The data disks and the streamer are likely to be expensive pieces of equipment, dedicated to their intended tasks. An alternative approach to the above is using a lower cost general purpose computer, also termed a server, as a streamer, and using low cost storage on low cost general purpose computers as the distributed storage. The alternative approach produces an additional advantage, which is that the distributed storage also has processing power, opening the door to distributed processing.

An aspect of some embodiments of the invention relates to other types of processing of the transport stream, being performed in a distributed fashion. The invention is suitable for distributing processing of stream components.

The term "changing of bit rate" in all its grammatical forms is used throughout the present specification and claims interchangeably with the term "rate shaping" and the term "rate reducing" and their grammatical forms.

The term "video stream" in all its grammatical forms is used throughout the present specification and claims interchangeably with the terms "stream", "data stream", "data file", "file", "MPEG stream", and "MPEG video stream" and their grammatical forms.

It is noted that the term video stream can refer to a stream which is limited in time, such as, by way of a non-limiting example, a movie, a television program, and a 30 second commercial, and the term can refer to a video stream which is not limited in time, such as a 24 hour a day program.

Apparatus which combines streams into a transport stream is termed herein a streamer.

Reference is now made to FIG. 1, which is a simplified illustration of a system constructed and operative according to an exemplary embodiment of the invention.

The system comprises a streamer 100, connected to one or more storage clusters 105.

The streamer 100 is configured to provide an output 120 or outputs 120 of one or more transport streams.

The streamer 100 requests the storage clusters 105 to send it video streams (not shown), and combines the video streams into the one or more transport streams.

If there is a need for processing to be performed on one or more of the video streams, the streamer 100 instructs one or more of the storage clusters 105 to perform the processing and provide a changed, processed, video stream for the combining By way of a non-limiting example, the streamer 100 tracks the bit rate of each of the transport streams. If a bit rate of a transport stream is about to exceed a pre-defined limit, the streamer 100 ensures, as will be further described below, that the bit rate of one or more of the video streams combined into the transport stream is lowered, thereby ensuring that the bit rate of the transport stream does not exceed the limit.

The streamer 100 instructs one or more of the storage clusters 105 to provide a version of one or more of video streams having a lower than nominal bit rate.

The storage clusters 105 provide the streamer 100 with a lower bit rate version of the one or more video stream which the streamer instructed to be at a lower bit rate.

Figure 2:
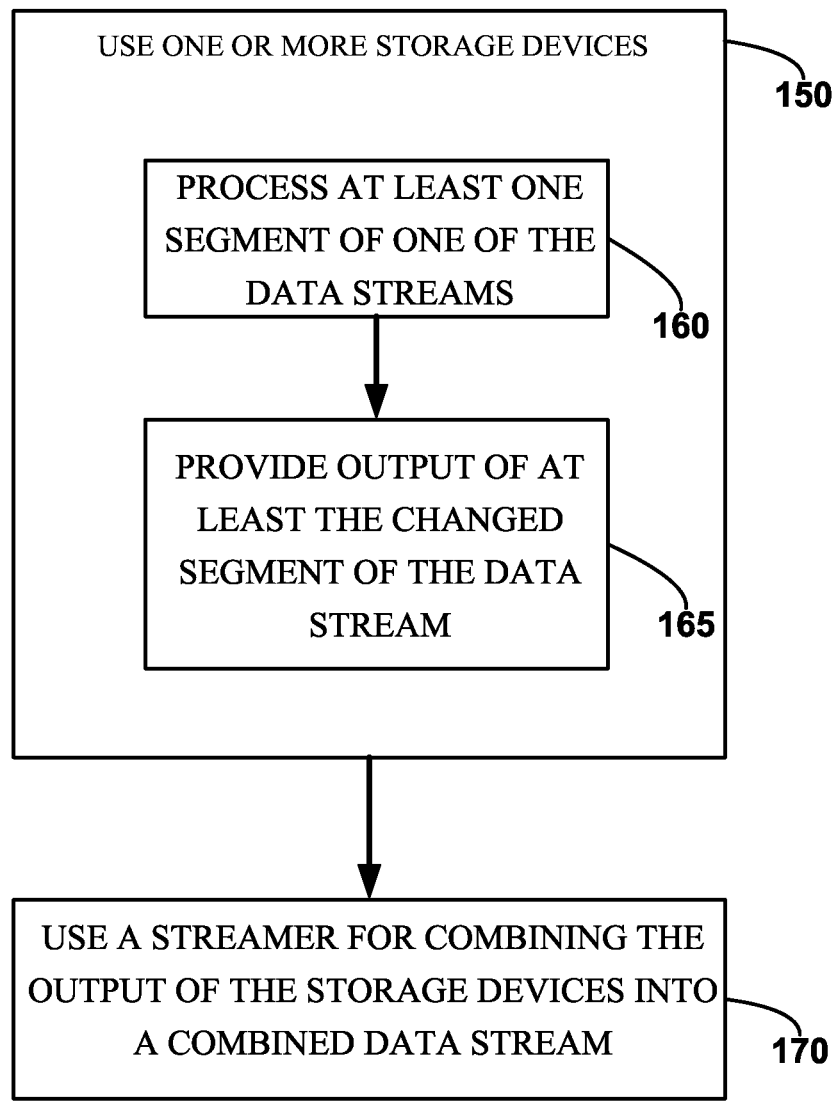
FIG. 2 is a simplified flow chart illustration of a method operative according to an exemplary embodiment of the invention.

Reference is now made to FIG. 2, which is a simplified flow chart illustration of a method operative according to an exemplary embodiment of the invention.

FIG. 2 depicts a flow chart of the method used in the system of FIG. 1, which uses one or more storage devices (150) for processing at least one segment of one of the data streams (160). An optional method of processing used by an embodiment of the invention is described further below with reference to FIG. 5.

Output of at least the changed data stream is provided (165), as described above with reference to FIG. 1, and will be described further below with reference to FIG. 3.

A streamer is used for combining the output of the storage devices into a combined data stream (170), as described above with reference to FIG. 1, and will be described further below with reference to FIG. 3.

Figure 3:
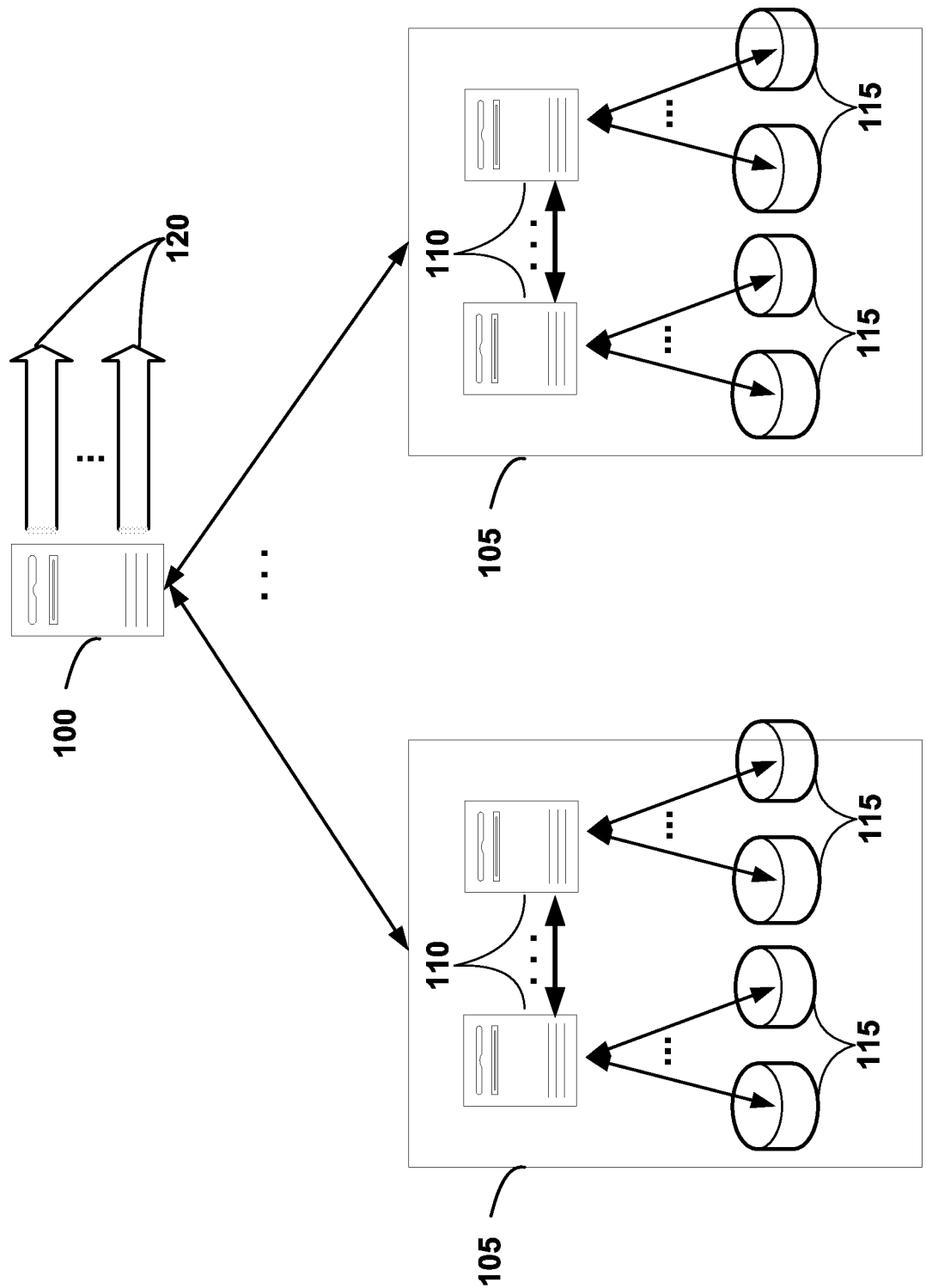
FIG. 3 is a more detailed illustration of an example embodiment of the system of FIG. 1.

Reference is now made to FIG. 3, which is a more detailed illustration of an example embodiment of the system of FIG. 1.

The system comprises a streamer 100, connected to one or more storage clusters 105. The storage clusters 105 each contain one or more storage machines 110, each of which is connected to one or more storage devices 115.

The streamer 100 optionally instructs one or more of the storage clusters 105 to provide a version of one or more of video streams having a lower than nominal bit rate.

The storage clusters 105 optionally provide the streamer 100 with a lower bit rate version of the one or more video streams which the streamer instructed to be at a lower bit rate.

The Streamer 100

The streamer 100 combines several video streams into a transport stream. The streamer optionally ensures that a sum of the bit rates of the video streams does not exceed a bit rate limit associated with the transport stream. Combining VBR video streams into a CBR transport stream, when the total bit rate of the video streams is less than the bit rate limit, is known in the art. For example, one way of doing so, is tracking the combined bit rate, and adding null data to the transport stream as needed to bring the bit rate of the combined transport stream up to a constant value.

A more efficient use of a CBR transport stream is to combine as many video streams as possible into the transport stream. Since the video streams show a variable bit rate, it is possible to combine the video streams such that their combined bit rate will usually be below the limit of the transport stream. When the combined bit rate of the video streams is expected to exceed the limit, the streamer 100 optionally replaces some or all of the video streams with lower bit rate versions of the video streams, and prevents the exceeding.

The average bit rate of each VBR video file or video file segment participating in a transport stream is optionally derived based on the following parameters: a modulation type for the MPTS, such as, by way of a non-limiting example, Quadrature Amplitude Modulation (QAM) type such as 64/128/256 Symbol Rate; and the number of streams participating in the MPTS.

Figure 4:
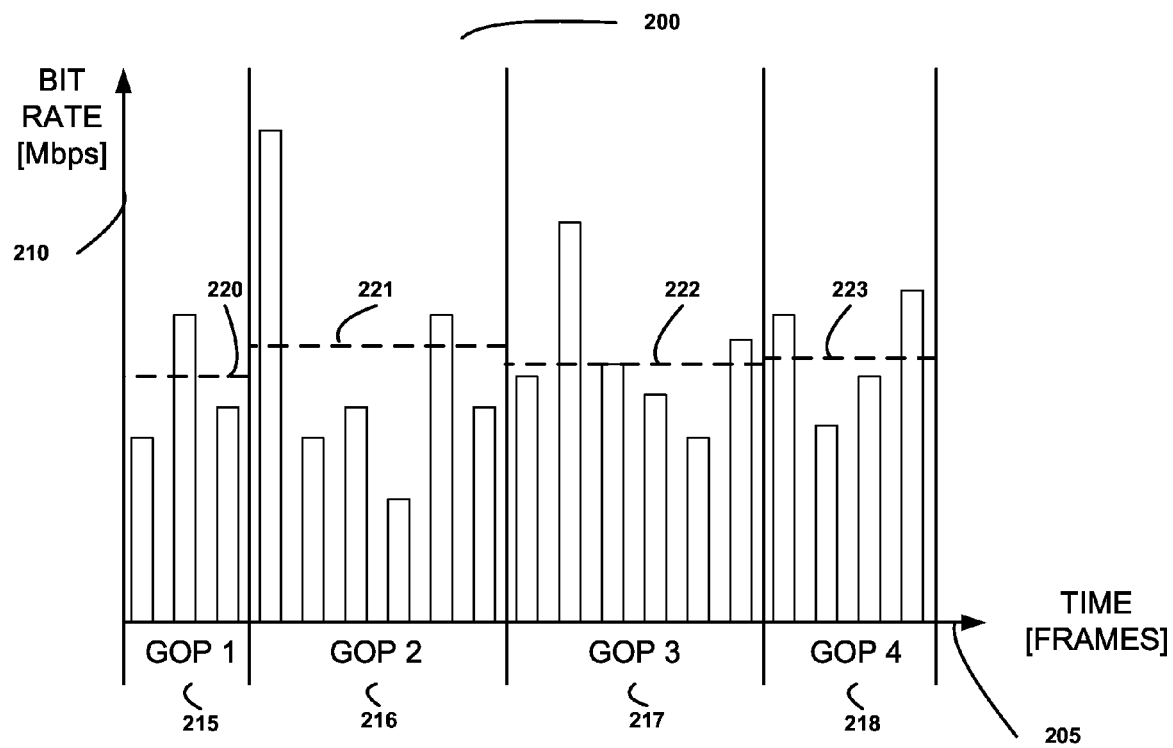
FIG. 4 is a simplified graphical illustration of variable bit rates in a video stream.

Reference is now made to FIG. 4, which is a simplified graphical illustration of variable bit rates in a video stream.

FIG. 4 depicts a graph 200 of bit rate of a segment of a video stream vs. time. The graph is of a segment of an original video stream with an original, unmodified, bit rate. The horizontal axis 205 of the graph 200 depicts time, in units of video frames. Since video is typically displayed at a constant frame rate, frames are directly proportional to time. The vertical axis 210 of the graph 200 depicts bit rate, in units of Mbps.

The segment contains several GOPs 215, 216, 217, 218. Each of the GOPs 215, 216, 217, 218, comprises individual pictures, one bar of the graph 200 standing for each picture. Each of the pictures has an inherent bit rate associated, based on the amount of data required to portray the picture, and a frame rate of the video stream. The inherent bit rate is depicted by the relative height of the bar which stands for the picture.

Since each of the GOPs 215, 216, 217, 218 is compressed together, each GOP is also associated with a bit rate. The bit rate of a GOP is based on the amount of data, after compression, which the GOP contains, a frame rate of the video stream, and the number of pictures within the GOP.

GOP bit rates 220, 221, 222, 223 are depicted by dotted lines corresponding to the bit rates of the GOPs 215, 216, 217, 218 respectively. The GOP bit rates 220, 221, 222, 223 are not equal, depending as they do on contents of the pictures of the video stream.

A maximal bit rate of the segment in the illustration of FIG. 4 is the GOP bit rate 221, associated with the GOP 2 216.

Figure 5:
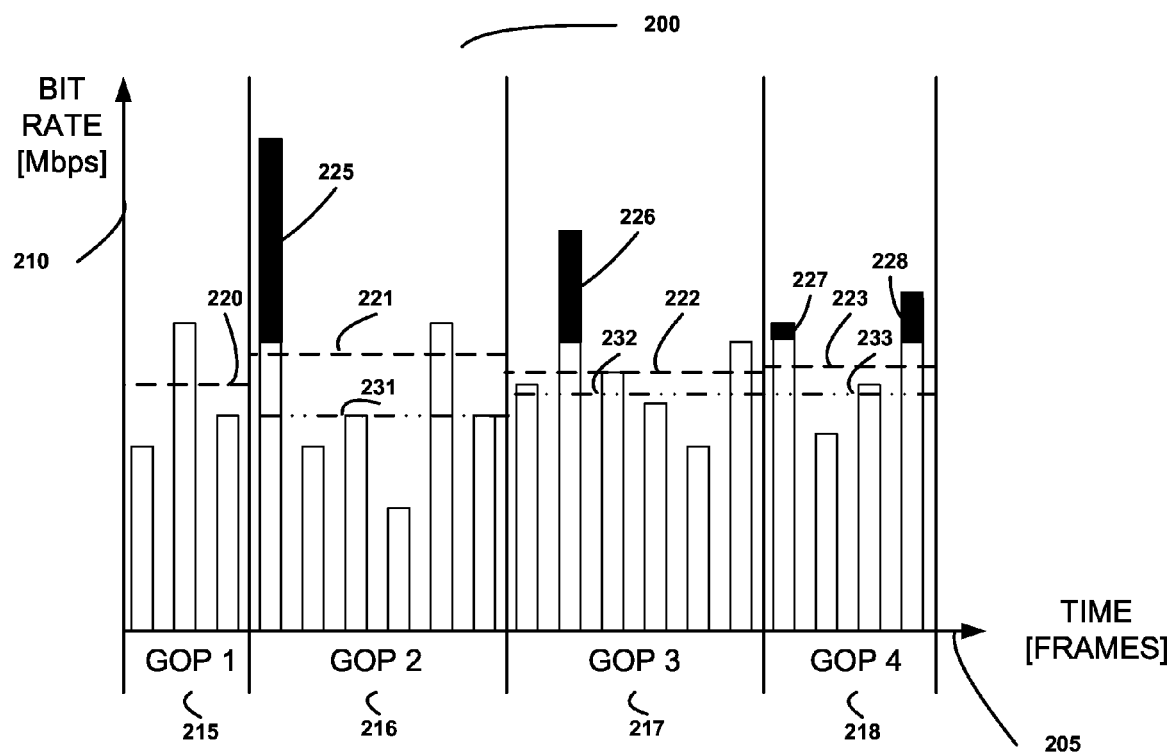
FIG. 5 is a simplified graphical illustration of how chopping off bit rate peaks reduces a maximal bit rate of a video stream in an embodiment of the invention.

Reference is now made to FIG. 5, which is a simplified graphical illustration of how chopping off bit rate peaks reduces a maximal bit rate of a video stream in an embodiment of the invention.

FIG. 5 depicts the segment of FIG. 4, in which bit rate peaks of individual pictures have been modified by "chopping off", that is reducing, just the bit rate peaks. The values of the unmodified picture bit rates and the unmodified GOP bit rates 220, 221, 222, 223 are still depicted in FIG. 5, for purpose of comparison and to aid understanding.

A picture in GOP 2 216, which had a highest inherent bit rate of the pictures of GOP 2, was reduced in bit rate by a first amount 225. A GOP bit rate 231 of GOP 2 216 is lower than the GOP bit rate 221 of GOP 2 216 before bit rate modification.

A picture in GOP 3 217, which had a highest inherent bit rate of the pictures of GOP 3 217, was reduced in bit rate by a second amount 226, different from the first amount 225. A GOP bit rate 232 of GOP 3 217 is lower than the GOP bit rate 222 of GOP 3 217 before bit rate modification.

Two pictures in GOP 4 218, which had the two highest inherent bit rate of the pictures of GOP 4 218, were reduced in bit rate by a third amount 227 and a fourth amount 228. A GOP bit rate 233 of GOP 4 218 is lower than the GOP bit rate 223 of GOP 4 218 before bit rate modification.

The files which together make up a transport stream change over time. For example, when the streamer is a VOD server, sessions are allocated by end users, and the streamer 100 is required to read files from the storage cluster 105. The streamer instructs each processing unit 110 in the storage cluster 105 to reduce the rate of certain GOPs according to a statistical multiplexing algorithm.

Since rate shaping can be computationally intensive, the streamer 100 optionally causes rate shaping of video streams to be performed by computing power available in the storage clusters 105 (FIG. 1). While storage clusters 105 typically contain a large amount of storage, which is needed for storing the video streams, the storage clusters are nevertheless capable of computation. Having several storage clusters 105 enables using the computation power built into a distributed video storage system for also rate shaping the video.

It is noted that, similarly to the example of FIG. 5, rate shaping is optionally not performed on an entire file, but rather on a file segment. The size of the file segment ranges from an entire file, to a portion of a file, down to a GOP.

Statistical Multiplexing (Statmux) Decision Making

Upon having an MPTS or a group of SPTS streams directed at a specific output with a specified maximum allowed bit rate, the streamer 100 (FIG. 1) starts reading one or more streams from one of the storage clusters 105.

Along with the streams being read, the streamer 100 reads metadata associated with each stream. More detail about the metadata is provided below, with reference to "Ingesting a Video File".

Based at least partly on the metadata, the streamer 100 can predict what will be the aggregated bit rate of all streams in the MPTS, or group of SPTS streams going into a specific output. The metadata also contains information about complexity of each stream, and enables the streamer 100 to predict a level of deterioration in video stream quality due to rate reduction.

By taking the metadata parameters into consideration, the streamer compiles a set of commands to the storage clusters 105, requesting the storage clusters 105 for relevant data segments with a specific bit rate per GOP.

In some embodiments of the invention, the streamer 100 is a component combining the streams into the data stream, and the component which considers the metadata and issues commands to the storage clusters 105 is a stream management server (not shown). The streamer 100 and the stream management server may or may not be separately housed and/or separately located.

SPTS

For legacy transport streams which do not support MPTS as their input, the statistical multiplexing method described above may be distributed among several SPTS and several streamers 100. Each streamer 100 manages one or more transport streams, and instructs relevant storage machines 110, via one or more storage clusters 105, to reduce the rate of video streams when necessary.

Each VBR program stream is padded with null stuffing into a CBR SPTS at the maximum allowed bit rate, and sent to a suitable output.

A distributed statmuxing method optionally manages an aggregated bandwidth of all streams going into a specific output transport stream, even when some video streams originate from different streamers machine.

Trick Play

During play out of a video stream, an end user may choose to use trick play modes, such as Fast Forward (FF), rewind, and pause. This section describes performance of the invention in case at least one of the video streams is played out using a trick mode.

Optionally, In FF and rewind modes, only a first I-frame from a GOP is requested and received by the streamer 100, and not all pictures of the GOP. Managing the bit rate is optionally done by the streamer 100, by adding a suitable number of P-frames to I-frames and forming newly generated GOPs.

If the bit rate of a GOP comprising I-frames only is still too high, bit rate reduction is optionally requested by the streamer 100 from the storage machines, in order to reduce the bit rate of the I-frame. Alternatively, the streamer 100 performs rate reduction for the I-frames.

In pause mode, the streamer 100 stops transmitting the video stream, so there is no need to use rate reduction for a paused video stream.

The streamer 100 takes pause mode into consideration, and for example, in case of a paused video stream, other streams in the transport stream may use more bit rate.

Rate Shaping

Optionally, rate shaping is done in real time, or approximately in real time, that is, just prior to transmitting the transport stream. Alternatively, the rate shaping is done ahead of real time, and changed bit rate video streams are saved until needed.

Whether the rate shaping is performed in real time or ahead of time, each of the storage machines 110 which performs rate shaping optionally receives instructions for rate shaping from the streamer 100, which include a bit rate parameter which specifies to a maximum bit rate, or by how much to reduce the bit rate of a file segment. Alternatively, each storage machine 110 is configured for one or more configurable levels of rate shaping.

Optionally, rate reduction reduces quality of images in frames of each GOP, so that a maximum bit rate is not exceeded. Alternatively the rate reduction reduces the bit rate by a percentage of the bit rate, or by subtracting a bit rate from an unmodified bit rate.

Reducing the bit rate is optionally performed over a period of time, corresponding to a certain segment of the video stream, and the amount of reduction may change after the period of time.

In some embodiments of the invention, each storage cluster 105 handles an internal reallocation of a bit rate budget within each GOP, for example, allocating more or less bit rate to different frames within a GOP based on the frame's complexity, optionally providing some areas of the frames with a specific treatment.

Rate Shaping in Approximately Real Time

When rate shaping is performed in real time or approximately real time, the streamer combines several video streams into the transport stream based, at least in part, on a total bit rate of the video streams and optionally on a bit rate limit for the transport stream.

It is noted that transport streams sometimes carry more than just video streams. The data carried by the transport stream beyond the video streams is hereby considered a data stream, and the description of data streams is taken to be included in the video stream examples.

Optionally, the streamer 100 estimates the bit rate of the transport stream, and optionally estimates the bit rate of each of the video streams. Optionally, the estimation is done by the streamer actually measuring the bit rate of the transport stream and optionally measuring the bit rate of each of the video streams.

The streamer 100 instructs the storage machines 110 which video streams to rate shape, and how to rate shape the video streams.

In some embodiments of the invention the streamer 100 instructs the storage machines 110 which video stream and at what bit rate to provide the streamer. In other embodiments of the invention the streamer 100 instructs the storage machines 110 which video stream to provide the streamer 100, and by what amount, or by what percentage, to lower the bit rate of the video stream.

Optionally the storage machines 110 which rate shape a video stream, also cache the rate shaped video stream, so that if the video stream needs to be output again as a rate shaped video stream, the cached rate shaped video stream is recovered from the cache.

Rate Shaping Ahead of Real Time

When rate shaping is done ahead of real time, the streamer 100 optionally instructs the storage clusters 105 which video stream to rate shape, to what bit rate to shape the video stream, and where to store the rate shaped video stream.

In other embodiments of the invention the streamer 100 instructs the storage clusters 105 which video stream to rate shape, by what amount, or by what percentage, to lower the bit rate of the video stream, and where to store the rate shaped video stream.

When rate shaping is done ahead of real time, metadata is optionally produced, associating some or all of the saved video streams with an estimated or measured bit rate. Optionally the metadata includes the bit rate of segments of the video streams, rather than a bit rate for an entire video stream.

Optionally, the metadata includes the bit rate for each individual GOP.

Optionally, the metadata for a video stream or for a segment of a video stream includes a maximum bit rate as well as an average bit rate.

Optionally, a video stream is stored in more than one version, with different versions having been rate shaped and comprising different bit rates. Optionally, only some segments of the video stream are rate shaped, the rate shaped segments preferably being the higher bit rate segments.

Optionally, the segments of the video stream which are rate shaped are as small as one GOP.

Since in the example described above rate shaping is performed ahead of real time, there may not be certainty that rate shaped versions or segments of a video stream will actually be used. In some embodiments of the invention deciding which video streams or segments thereof will be rate shaped is performed according to projected statistics of video demand. In some embodiments of the invention the deciding is performed according to actual video demand.

Various schemes for saving computation are contemplated, such as: rate shaping only video streams which are most in demand; rate shaping only high bit rate segments of video streams; rate shaping most-in-demand video streams in advance of real time, and rate shaping other video streams in real time or approximate real time; and rate shaping a video stream in real time when first combined into a transport stream, and saving the rate shaped video stream or rate shaped segments of the video stream, and their associated metadata, for later re-use.

Various schemes for saving storage space are contemplated, such as: saving rate shaped versions only of video streams which are most in demand; saving rate shaped versions of only high bit rate segments of video streams; and saving rate shaped versions of a video stream only after a first combining into a transport stream.

Storage

An exemplary embodiment of the invention includes a storage cluster 105, which comprises several storage machines, also termed data servers. Each storage machine has one or more storage devices, and some processing power.

Optionally, the storage cluster 105 protects data by storing redundant data. The protection is performed using schemes such a RAID. It is to be noted that the protection is configured per file segment. The file segment corresponds to a video stream, segment of a video stream, and even a GOP of a video stream.

Rate Reduction with Data Protection

In case there is data loss on a first one of the storage clusters 105, the streamer 100 requests rate reduced file segments from a second one of the storage clusters 105. The second storage cluster 105 gathers the required file segments from the second storage cluster 105. The second storage cluster 105 performs rate reduction on the recovered file segments.

Fallback Copy

Optionally, each file is stored in a predefined rate reduced version on the storage cluster. The version is optionally either a CBR version, or a capped VBR with a maximum bit rate which is not higher then the average bit rate of the original stream. The predefined rate reduced version is termed a fallback copy.

In case there is data loss of an original version, or if there is no available processing power to reduce the rate of the original version, the fallback copy is optionally used. The fallback copy is also optionally used if the bit rate of the fallback copy falls inside the limits of the bit rate required by the streamer 100.

Caching of Processed GOPs

Each storage machine 110 optionally has a cache containing already rate reduced GOPs. The cache is optionally based upon an LRU method. Some embodiments of the invention use a cached version of a rate reduced GOP rather than utilize rate reduction. The preference for using the cache, and a size of the cache, are determined based at least partly on the available processing power of the storage machine 110.

By way of a non-limiting example, when the streamer 100 requests a certain GOP at a bit rate of 2.5 Mbps, and if there is a cached version of the same GOP reduced to 2.4 Mbps, the system optionally chooses to use the cached 2.4 Mbps version. This frees the storage machine 110 to rate shape other GOPs that are not already cached.

The storage machine 110 optionally has a dedicated amount of storage and storage IO for caching purposes.

Rate Reduction and "Flash-Crowd"

A data server may optionally get multiple requests for rate shaping a file segment, from multiple streamers, or optionally multiple requests from a single streamer but intended to be combined in an MPTS the single streamer processes.

Such a scenario can be common when many users would like to watch a specific file at substantially the same moment, for instance a newly issued popular event. The data server which stores the requested video segment receives many requests for the same segment, more than it can process. The data node reaches a point where it is not able to serve all the requests and maintain an approximately real-time response.

In some embodiments of the invention, the data server aggregates requests and chooses to process only several rate shaping commands, such that will not exceed its processing power and its read-from-storage capabilities.

In case a specific rate reduction request wasn't selected for real-time processing, the data server optionally provides a copy of a closest rate shaped version, or a closest rate shaped version with less than the required bit rate, available of the requested rate shaped segment.

Ingesting a Video File

An ingested video file is typically encoded to a VBR format. The streamer 100 parses the video file, and breaks the video file into file segments.

In some embodiments of the invention the streamer 100 optionally produces and stores, optionally on one or more storage clusters 105, metadata about the stream behavior and complexity. The metadata is optionally used later for statistical multiplexing decision making.

During the ingestion process, and optionally during real time rate shaping, the metadata for the video file is generated, and kept in a separate file. The information saved in the metadata file contains information about the stream bit rate, frame structure and complexity.

Data Segments

Video streams are optionally striped across storage devices 115 in the storage machines 110 and optionally also across storage machines 110 in a storage cluster 105.

Each file is optionally cut into segments which are optionally distributed among the storage devices. Each segment contains one or more GOPs belonging to the file.

It is to be noted that each storage device may have a segment from each file, and vice versa, segments from each file may appear on each storage device.

The striping and distribution of the files among the storage machines, coupled with the rate shaping requirements made of the storage machines, cause a distribution of the computation load among the storage machines.

The number of GOPs per segment is determined in order to optimize throughput of a clustered file system. The number of GOPs per segment is determined based, at least partly, on storage parameters such as block sizes in the storage device, on computation parameters such as computation speed on the storage machine, on the number of computation machines, and on a bit rate of the segment. For example, when a segment size is determined to be 1 MB, the segment can contain 10 GOPs of a Standard Definition (SD) video stream, or 5 GOPs of a High Definition (HD) stream.

It is noted that when an optimal size of a segment is not completely filled by GOPs, padding is optionally applied.

In some embodiments of the invention, a segment is smaller than an MPEG GOP. A segment can be, by way of a non-limiting example, a frame; a number of frames, with no relation to the underlying MPEG GOP; and even part of a frame, even as small as a slice of an MPEG macroblock.

It is noted that storing am MPEG GOP together can save time in assembling data for rate shaping.

It is noted that once a segment has been rate shaped, the rate shaped segment can optionally be stored on one data server, and can optionally be stored on more than one data server.

In some embodiments of the invention, especially where MPEG2 stream are concerned, a segment is minimally chosen to be one or more GOPs, that is all frames from one I-frame to a next I-frame, which fit into and are aligned to a 1 MB data block.

Data Protection

Each segment of data written into storage is optionally protected by a data protection scheme, by way of a non-limiting example a data protection scheme using data redundancy, such as RAID. The level of RAID protection is any level of RAID protection, such as RAID level 0, 1, 2, 3, 4, 5, and so on, and may optionally be different per file. Each segment is thus protected by redundant data, which is written into the storage cluster, to different storage devices, on different storage machines.

In some embodiments of the invention protection management is provided by the storage cluster. In some embodiments of the invention protection management is provided by each of the storage machines. In some embodiments of the invention protection management is provided by the streamer.

A non-limiting example of protection functionality is now provided. A streamer attempts to fetch a file segment from a first storage device on a first storage machine. Due to failure of the first storage device or the first storage machine, the data segment is unavailable.

Recovery option 1: when the streamer manages the protection scheme, the streamer fetches redundant data written by the protection algorithm on a second storage device, and reconstructs the unavailable data. The streamer does not necessarily rate shape the reconstructed data. If rate shaping is necessary, the streamer optionally instructs the storage clusters providing other streams to provide the other streams at lower bit rate.

Recovery option 2: when each of the storage machines manages the protection scheme, the streamer requests a second storage machine to fetch the unavailable data. The second storage machine retrieves the redundant data, and reconstructs the previously unavailable data using the protection scheme. The storage machine then performs rate shaping on the reconstructed segment, and deliver the rate shaped and recovered data to the streamer.

Recovery option 3: when the streamer manages the protection scheme, the streamer fetches redundant rate shaped data from the storage cluster, and reconstructs the unavailable data according to the protection scheme.

Additional Features

The storage machine 110 optionally overlays text, video, and/or sound over file segments, according to instructions received from the streamer 100. The overlay is optionally performed in the compressed domain.

Each storage machine 110 can optionally convert video segments from one video format to another, using a transcoding algorithm. The transcoding is optionally per data segment, so that each storage machine 110 is only required to transcode segments which are stored thereon.

It is expected that during the life of a patent maturing from this application many relevant rate shaping methods will be developed and the scope of the term rate shaping is intended to include all such new technologies a priori.

The terms "comprises", "comprising", "includes", "including", "having", and their conjugates, mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a video stream" or "at least one video stream" may include a plurality of video streams, including combinations thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the to extent that section headings are used, they should not be construed as necessarily limiting.

What is claimed is:

1. A distributed stream processing system comprising:
a plurality of storage machines, each of which comprises:
  a storage machine memory; and
  a storage machine processor coupled to the storage machine memory for performing the following:
  code instructions to processing at least one segment of a data stream, thereby producing at least one changed segment of the data stream; and
  code instructions to providing output of the at least one changed segment of the data stream to a streamer, and
wherein the streamer comprises:
  a streamer memory; and
  a streamer processor coupled to the streamer memory for performing the following:
  code instructions to accepting the output of the plurality of storage machines;

code instructions to combining the output of the plurality of storage machines into a transport stream;
providing bit rate control instructions to the plurality of storage machines; and
outputting the transport stream;
wherein the respective storage machine processor of each of the plurality of storage machines accepts the bit rate control instructions from the streamer and changes the bit rate of said at least one segment of said data stream according to the instructions.

2. The system of claim 1 in which at least one storage machine of said plurality of storage machines is further configured to store at least the at least one changed segment of the data stream.

3. The system of claim 1 in which at least one of the data streams is a video stream.

4. The system of claim 3, wherein said storage machine processor transcodes the video stream.

5. The system of claim 3, wherein said streamer processor inserts content into the video stream.

6. The system of claim 3, wherein said streamer processor produces video effects in the video stream.

7. The system of claim 3, wherein said streamer processor performs content protection processing with respect to the video stream.

8. The system of claim 3, wherein said streamer processor searches in the video stream.

9. The system of any one of claim 1 in which the plurality of storage machines use a data protection scheme to store said at least one changed segment of the data stream.

10. The system of claim 1, wherein said streamer processor produces and storing metadata comprising information about a bit rate of said at least one changed segment of the data stream.

11. The method of claim 1, wherein the streamer processor of the streamer spreads a workload associated with processing of the data stream by instructing a transmission of the bit rate control instructions to f the plurality of storage machines.

12. A method for combining a plurality of data streams comprising:
using a plurality of storage machines for:
processing at least one segment of a data stream, thereby producing at least one changed segment of the data stream;
outputting said at least one changed segment of the data stream,
combining the output of the storage machines into a combined data stream; and
outputting the combined data stream;
wherein the method further comprises providing bit rate control instructions to the plurality of storage machines, wherein the plurality of storage machines accept the bit rate control instructions from a streamer and change the bit rate of said at least one segment of a data stream according to the instructions.

13. The method of claim 12, wherein said storage machine processor stores the at least one changed segment of the data stream.

14. The method of claim 12 in which at least one of the data streams is a video data stream.

15. The method of claim 14 in which the processing comprises video stream processing.

16. The method of claim 12 in which the processing comprises video stream processing.

17. The method of claim 12 and further comprising, storing said at least one changed segment of the data stream, and performing the outputting upon a request from the streamer.

18. The method of claim 12 and further comprising producing and storing metadata comprising information about a bit rate of said at least one changed segment of the data stream.

19. A system configured to receive a transport stream comprising a plurality of data streams comprising:
a streamer comprising:
a streamer memory; and
a streamer processor coupled to the streamer memory for performing the following:
code instructions splitting the transport stream into a plurality of data streams;
code instructions to distributing the plurality of data streams among a plurality of storage machines;
wherein each one of the plurality of storage machines comprises:
a storage machine memory; and
a storage machine processor coupled to the storage machine memory for performing the following:
receiving and storing one or more of the data streams from the streamer;
processing at least one segment of a data stream, thereby producing at least one changed segment of the data stream; and
storing at least the at least one changed segment of the data stream;
wherein the streamer processor of the streamer provides bit rate control instructions to the plurality of storage machines;
wherein the respective storage machine processor of each of the plurality of storage machines accepts the bit rate control instructions from the streamer and changes the bit rate of said at least one segment of said data stream according to the instructions.

* * * * *